(12) United States Patent
Akana

(10) Patent No.: US 9,420,751 B2
(45) Date of Patent: Aug. 23, 2016

(54) PLANT MANIPULATOR

(71) Applicant: Stephen Jay Akana, Berkeley, CA (US)

(72) Inventor: Stephen Jay Akana, Berkeley, CA (US)

(73) Assignee: Stephen Jay Akana, Berkeley, CA (US)

( * ) Notice: Subject to any disclaimer, the term of this patent is extended or adjusted under 35 U.S.C. 154(b) by 275 days.

(21) Appl. No.: 13/789,615

(22) Filed: Mar. 7, 2013

(65) Prior Publication Data

US 2014/0115964 A1    May 1, 2014

Related U.S. Application Data

(60) Provisional application No. 61/719,939, filed on Oct. 29, 2012.

(51) Int. Cl.
*A01G 9/12* (2006.01)
*A01G 7/06* (2006.01)

(52) U.S. Cl.
CPC .. *A01G 9/12* (2013.01); *A01G 7/06* (2013.01); *Y10T 29/49826* (2015.01); *Y10T 156/10* (2015.01)

(58) Field of Classification Search
CPC ................ A01G 17/04–17/10; A01G 9/12; A01G 7/06
USPC ............ 47/1.01 R, 1.01 S, 44, 45, 46, 41.15, 47/66.1, 66.3, 66.4, 66.6, 72; 29/428; 138/110, 118, 120
See application file for complete search history.

(56) References Cited

U.S. PATENT DOCUMENTS

| | | | | |
|---|---|---|---|---|
| 464,879 A * | 12/1891 | Knapp | ............................ | 47/32.4 |
| 533,644 A * | 2/1895 | Hell | .................................. | 47/55 |
| 1,799,672 A * | 4/1931 | Burke et al. | ................... | 264/261 |
| 2,402,178 A * | 6/1946 | Nilssen | ................ | B23K 11/002 219/161 |
| 2,722,237 A * | 11/1955 | Rosel | ............................ | 248/317 |
| 3,211,828 A * | 10/1965 | Cloud, Jr. | ................. | H02G 1/00 174/135 |
| 3,309,258 A * | 3/1967 | Gallo | ........................... | 248/27.8 |
| 3,367,370 A * | 2/1968 | Sherlock | ........................ | 138/104 |
| 3,580,983 A * | 5/1971 | Jackson | ............................ | 174/47 |
| 4,093,694 A * | 6/1978 | Browning | ........... | B29C 37/0025 264/246 |
| 4,106,234 A | 8/1978 | Gallo | | |
| 4,255,378 A * | 3/1981 | Miller et al. | .................. | 264/322 |
| 4,327,778 A * | 5/1982 | Williams | ....................... | 138/149 |
| 4,600,146 A * | 7/1986 | Ohno | ..................... | A01N 25/18 138/103 |
| 4,655,000 A * | 4/1987 | Swick et al. | ....................... | 47/44 |
| 4,713,271 A * | 12/1987 | Searl et al. | ................... | 428/36.5 |
| 4,860,799 A * | 8/1989 | Van Noten | .................... | 138/167 |
| 5,060,417 A | 10/1991 | Court | | |
| 5,226,456 A * | 7/1993 | Semak | .......................... | 138/107 |
| 5,293,713 A | 3/1994 | Ahmed | | |
| 5,340,622 A | 8/1994 | Curitti | | |

(Continued)

*Primary Examiner* — Kristen C Hayes
*Assistant Examiner* — Ebony Evans
(74) *Attorney, Agent, or Firm* — Jay White; Bowen Liu; David Lewis

(57) ABSTRACT

An embodiment of a plant manipulator is disclosed, which may have a flexible cylindrical member that is bent to hold a plant in a particular configuration to train the plant. The plant manipulator may include a first end and a second end, a long edge of the flexible cylindrical member, a length of the long edge of the flexible cylindrical member, and a slit along the length of the longest edge of the flexible cylindrical member. The plant manipulator may also have a malleable rigid member with a first and second end, a long edge of the flexible cylindrical member, and a length of the long edge of the malleable rigid member. The length of the long edge of the flexible cylindrical member may be coupled along the length of the long edge of the flexible cylindrical member.

13 Claims, 23 Drawing Sheets

(56) References Cited

U.S. PATENT DOCUMENTS

| | | | |
|---|---|---|---|
| 5,349,780 A | 9/1994 | Dyke | |
| 5,472,768 A * | 12/1995 | Anson | 428/131 |
| 5,816,742 A * | 10/1998 | Cordewener | 405/43 |
| 6,016,846 A * | 1/2000 | Knittel et al. | 138/128 |
| 6,128,851 A | 10/2000 | Ralston | |
| 6,363,655 B1 | 4/2002 | Napolitano | |
| 6,599,591 B1 | 7/2003 | Scott | |
| D510,240 S * | 10/2005 | Gall | D8/1 |
| 8,307,580 B2 | 11/2012 | Lais et al. | |
| 8,497,425 B2 * | 7/2013 | Morrow | 174/68.1 |
| 2010/0005714 A1 | 1/2010 | Aiken | |
| 2010/0299993 A1 | 12/2010 | Lais et al. | |
| 2011/0258923 A1 | 10/2011 | Lais et al. | |
| 2012/0175489 A1 | 7/2012 | Weder | |
| 2014/0163664 A1 * | 6/2014 | Goldsmith | 623/1.11 |

\* cited by examiner

900

1400

US 9,420,751 B2

PLANT MANIPULATOR

CROSS-REFERENCE TO RELATED APPLICATIONS

This application claims priority benefit of U.S. Provisional Patent Application No. 61/719,939, entitled "HORTICULTURAL AID," filed Oct. 29, 2012, by Stephen Jay Akana, which is incorporated herein by reference.

FIELD

This specification generally relates to systems for controlling plant growth.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

Plant cultivators have found that one can manipulate the growth of plants to conform to a particular growth pattern. One cultivation technique for enhancing growth is called training the plant. Training typically involves bending an element of a plant in order to determine the manner and direction in which the plant grows. For instance, cultivators find that the yield of a particular plant is directly related to the plant's exposure to the light source upon which the plant is dependent for photosynthetic processes. One may train a plant to change configurations in order to improve a plant's light exposure.

Implements used to manipulate the plant may include strings and stakes. Strings and stakes can be quite cumbersome and may be difficult to adjust with plant growth, as the plant growth shifts all of the ties, often requiring consistent cumbersome reconfiguration. Stakes and strings often run into one another causing tangling and confusing knots that can contort a plant inappropriately.

Also, plants may become damaged during the course of growth. In fact, cultivators often intentionally cause damage to plants in order to better effectuate eventual yields. For instance, many engage in the practice of cracking, where the plant limbs are twisted in order that the fibrous elements within the plant element break and are forced to reform to create a stronger plant element. Cracking can even lead to severing of a plant element if a cultivator is not careful. There is little recourse for someone who wishes to reattach two severed plant elements. The stakes and strings may be sufficient for rudimentarily recombining the branches, but the stakes and strings are too cumbersome to use for the purposes of reattaching severed plant limbs and may not create a flush junction between the severed plant elements. Others have tried wrapping the two elements to make the elements merge, but the wrapping does not create the best junction, can cause rotting of the branch, and does not accomplish the goal of manipulating the plant growth in a particular direction.

BRIEF DESCRIPTION OF THE FIGURES

In the following drawings, like-reference numbers refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just address one deficiency that may be discussed in the specification, and some embodiments may not address any of these deficiencies.

In general, at the beginning of the discussion of each of FIGS. 1-22 is a brief description of each element, which may have no more than the name of each of the elements in the one of FIGS. 1-22 that is being discussed. After the brief description of each element, each element is further discussed in numerical order. In general, each of FIGS. 1-22 is discussed in numerical order and the elements within FIGS. 1-22 are also usually discussed in numerical order to facilitate easily locating the discussion of a particular element. Nonetheless, there is no one location where all of the information of any element of FIGS. 1-22 is necessarily located. Unique information about any particular element or any other aspect of any of FIGS. 1-22 may be found in, or implied by, any part of the specification.

Figure 1:
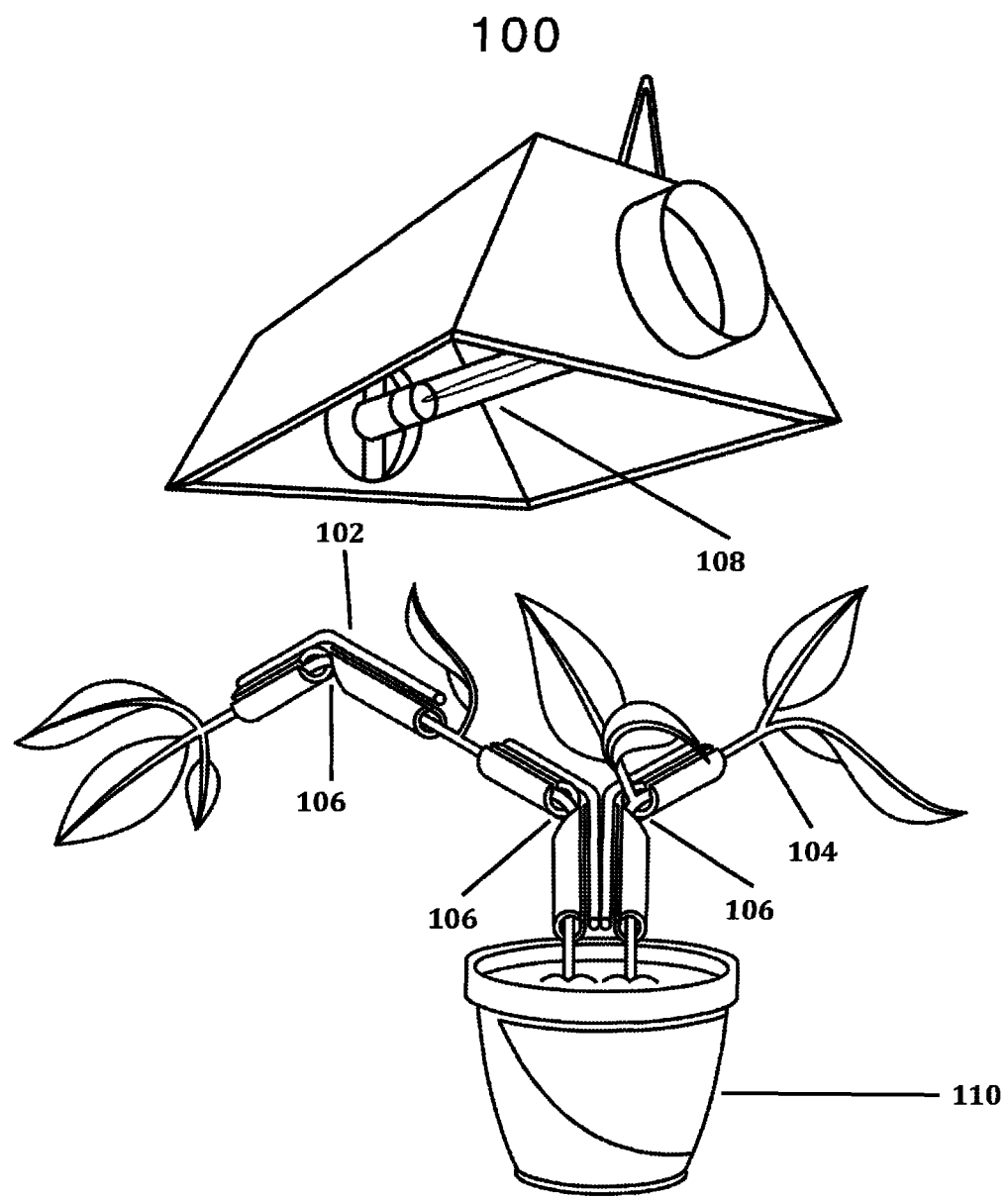
FIG. 1 shows a block diagram of an embodiment of a system for manipulating a plant.

FIG. 1 shows a block diagram of an embodiment of a system 100 for manipulating a plant. The system 100 may include a plant manipulator 102, a plant 104 with a plant element 106, a light source 108, and a plant growth medium 110. In other embodiments, the system 100 may not have all of the elements listed and/or may have other elements in addition to or instead of those listed.

The plant manipulator 102 is a device, which is used to manipulate the growth and development of a plant. The length of the plant manipulator 102 may be any length that can hold a plant element. For instance, the length may be from a half inch to five feet. Plant 104 is plant that is being trained by plant manipulator 102. The plant 104 is a biological organism and a member of the plant kingdom. The plant 104 may be any plant that may be manipulated including, tomato plants, fruit trees, cannabis plants, shrubberies, and bushes, for example.

Plant element 106 is an element of the plant 104 that is being altered by plant manipulator 102. The plant 104 may benefit from manipulating its plant element 106 in order to maximize light exposure of the plant elements. The plant element 106 is a part of the plant 104 which may be bent to benefit the yield of the plant 104. The plant element may be, for example, a branch, a stem, a bud, a flower, a leaf, a pod, a bract, and a calyx. The plant manipulator 102 may be coupled to the plant element 106 of the plant 104 in a configuration that manipulates the plant element 106 to grow in a particular direction or a particular way. For instance, the plant manipulator 102 may be attached to a plant element 106 by a user, such that the plant manipulator 102 substantially encompasses the plant element 106. The plant manipulator 102 may then be contorted to force contortion of the plant element 106. In an embodiment, the plant element 106 has a first end and a second end, while the plant element 106 is cracked before placing either or both of the first end of the plant element 106 and the second end of the plant element 106 in the plant manipulator 102.

In one embodiment, the plant manipulator 102 may be an elongate member with a flexible cylindrical member coupled substantially along the cylindrical member's long edge to a malleable rigid member substantially along the long edge of the malleable rigid member. The cylindrical member may have a slit across the length of the cylindrical member, which may be positioned at any arc angle along the circular edge of the cylinder from the point at which the flexible cylindrical member is coupled to the malleable rigid member. The plant element 106 may be placed in the plant manipulator 102 at each end of the plant manipulator in the slit of the flexible cylindrical member. The cylindrical member may be cut in order to allow greater flexibility and a greater range of angles at which the plant element 106 may be bent within the plant manipulator 102.

The light source 108 is a source of light suitable for photosynthetic development. The light source 108 may be any sufficient light source for photosynthetic development including, for example, high-pressure sodium, metal halide, light emitting diode ("LED"), mercury vapor, halogen, fluorescent, fiber optically transported sunlight, sunlight, and the like. The plant 104 may require the light source 108 in order to grow.

The plant grow medium 110 is a foundation in which a plant may establish a root system and from which a plant may grow. Examples of agricultural plant grow media 110 include, for example, soil, soil-less, pete, perlite, rockwool, and co-co. In one embodiment, the plant grow medium 110 may be the ground itself, as a source of soil.

Figure 2:
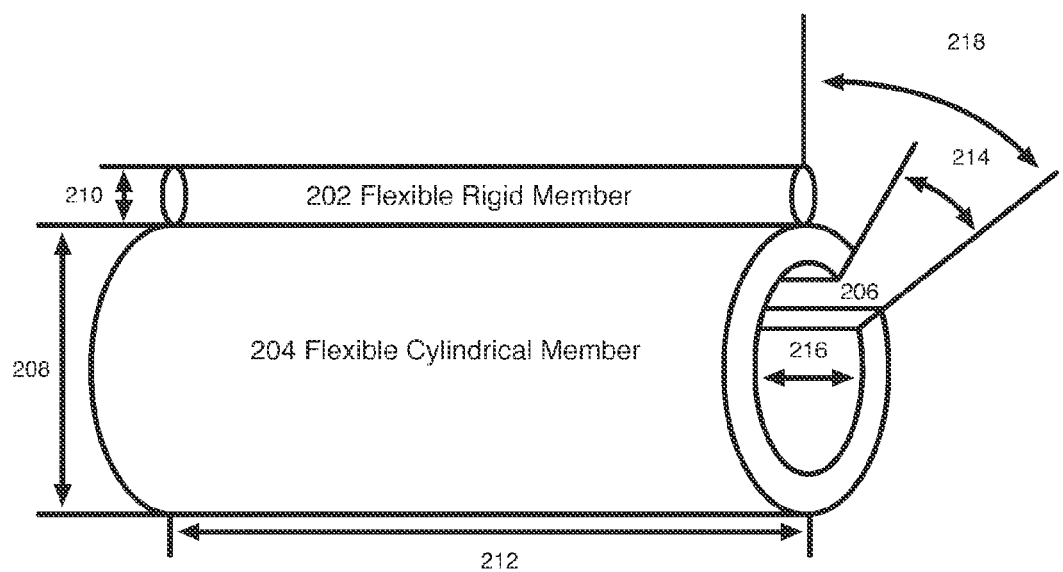
FIG. 2 shows a block diagram of an embodiment of a plant manipulator of FIG. 1.

FIG. 2 shows a block diagram of an embodiment of a plant manipulator 102. The plant manipulator may have a malleable rigid member 202, a flexible cylindrical member 204, a slit 206, an outer diameter of the flexible cylindrical member 208, an outer diameter of the malleable rigid member 210, a length of the plant manipulator 212, a split arc angle 214, an inner diameter of the flexible cylindrical member 216, and arc angle to the slit 218. In other embodiments, the plant manipulator 102 may not have all of the elements listed and/or may have other elements in addition to or instead of those listed.

The malleable rigid member 202 is a member capable of being bent, but maintains the bent shape after being bent. The malleable rigid member 202 may be, for example, a metal wire, a metal pole, and a flexible polymeric substance. The malleable rigid member may be composed of a number of malleable rigid materials, including, for example, aluminum, galvanized steel, steel, copper, and the like. One may use a thicker malleable rigid member 202 as a plant 104 develops further, as the plant elements 106 being manipulated by the plant manipulator 102 may thicken and become too sturdy for a particular type of malleable rigid member 202 to manipulate.

The flexible cylindrical member 204 is a member capable of being bent and cut in order to hold a plant element 106 and bend at an angle. In one embodiment, the flexible cylindrical element may be a soaker tube. In one embodiment, the flexible cylindrical member 204 is a soaker tube. In alternative embodiments, the flexible cylindrical member 204 may be composed of poly-vinyl chloride or polyethylene.

The lengths of the malleable rigid member 202 and the flexible cylindrical member may be the same or different. For instance, the malleable rigid member 202 may be shorter than the flexible cylindrical member 204 or vice versa. The malleable rigid member may only be present in certain portions of the plant manipulator as is necessary for appropriate support. The ratio of the length of the malleable rigid member 202 and the length of the flexible cylindrical member 204 may be any of a range of values from 0.6 to 1, for example. The plant manipulator 102 may also be manufactured in larger lengths and then cut to specification by the end user.

The slit 206 is a cut along the length of the flexible cylindrical member 204. The inner diameter 208 of the flexible cylindrical member 204 may be sufficient to not only contain a plant element 106 but restrict the freedom of movement of the plant element 106 in order to manipulate the plant's growth.

The slit 206 may be large enough to accept the plant element 106 but may be small enough such that the plant element 106 cannot be removed from the flexible cylindrical member 204 of the plant manipulator 102 without increasing the size or arc angle 214 of the slit 206. In one embodiment, the ratio of plant element diameter to slit opening size may be anywhere from 0.95:1 through 200:1 depending on the configuration of the plant manipulator 102. For instance, the flexible cylindrical member 204 may be sufficiently elastic as to be stretched open at the slit and then reestablish its original confirmation with integrity, such that the slit 106 may be substantially absent after the plant element 106 has been inserted into the plant manipulator 102. In another embodiment, the flexible cylindrical member 204 may be flexible enough as to allow a slit that is wider than the plant when force is exerted, with an added element to hold the slit closed after the plant element 106 is inserted in the plant manipulator 102. The slit 206 may have an arc angle. In one embodiment, the ratio of the arc angle of the slit 206 without a plant element 106 in the plant manipulator 102 to the circumference of the round edge of the flexible cylindrical member 204 without a slit may be 0.49999999 to 0.0000001. The slit 206 may be a linear cut such that the slit 206 exists along the long edge of the flexible cylindrical member 204.

The rigid member diameter 210 may be any diameter appropriate for the plant element 106 to be contained. In one embodiment, the malleable rigid member diameter 210 may be a sixteenth of an inch, an eighth of an inch, three sixteenths of an inch, and half an inch, for example. For instance, a younger plant may require a solid wire between a thirty-second of an inch and three sixteenths of an inch thick. A more developed plant element 106 with a thicker root system may require a half-inch rigid member diameter 210 of copper pipe in order to maintain sufficient integrity to manipulate a better developed branch. The malleable rigid member diameter 210 may be from $\frac{1}{20}^{th}$ of an inch to one and a half inches.

The slit 206 may be of any arc angle 214. The arc angle 214 may affect the extent to which there is an opening in the plant manipulator 102 to accept a plant element 106 in the flexible cylindrical member 204. The flexible cylindrical member 204 may be hollow, having an outer diameter 208 and an inner diameter 216. The diameter of the plant element 106 may be between 65% and 99.999% the size of the inner diameter 216 of the flexible cylindrical member 204. The slit's arc angle 214 may also be expressed as a distance between the outer edges of the flexible cylindrical member 204, and the distance may be between 0 inches and $\frac{1}{32}$ of an inch. In one embodiment, the flexible cylindrical member 204 may have an inner diameter 216 in a range of $\frac{3}{16}$ inches to $\frac{5}{16}$ inches, an outer diameter 208 in a range of $\frac{3}{8}$ inches to $\frac{1}{2}$ inch, and a wall thickness of $\frac{3}{32}$ inches.

The slit 206 may be situated at a particular arc angle to the slit 218 along the rounded edge of the cylindrical member 204 with respect to the junction between the malleable rigid member 202 and the flexible cylindrical member 204. A wide variety of arc angles to the slit 218 are possible. In an embodiment, the arc angle to the slit 218 may be an angle in a range from 5 degrees to 25 degrees. In another embodiment, the arc angle to the slit 218 may be 15 degrees. The arc angle to the slit 218 may be 270 degrees. The arc angle to the slit 218 may be anywhere from slightly more than zero degrees to slightly less than 360 degrees. The arc angle to the slit 218 may have a range of 0.000001-90 degrees. In an embodiment, the arc angle to the slit 218 may have a range of 0.00001-270 degrees. The arc angle to the slit 218 may further have ranges of 0.0001 to 359.99 degrees, 45-300 degrees, and 36-127 degrees, for example. In another embodiment, the arc angle may be of a range of 5-45 degrees. The arc angle to the slit 218 may be set to prevent the plant element 106 from dislodging by situating the slit in a planar space different from a planar space in which the plant element 106 is being bent.

The length of the plant manipulator 212 may be any length. Examples of the length of the plant manipulator 212 may include, for example, a range of 1 inch to $\frac{3}{2}$ inches, a foot, a range of a foot to 3/2 feet, 11¾ inches, 2 feet, a range of an inch to two feet, and a range of two inches to ten inches.

In an alternative embodiment, the malleable rigid member 202 may be embedded in the material of the flexible cylindrical member 204 by machine. In this embodiment, the machine may cut a slit 206 along the length of the flexible cylindrical member 204. In one embodiment, a $\frac{1}{16}$" aluminum wire (malleable rigid member 202) may be embedded in the material of a rubber soaker hose (flexible cylindrical member 204) with a slit 206 cut along the length of the rubber soaker hose to make a plant manipulator. The slit may be cut along the length of the soaker hose at a line segment located an arc angle along the round edge of the soaker hose from the embedded wire, the arc angle ranging between 5 degrees and 25 degrees. The plant manipulator may be cut to length.

Figure 3:
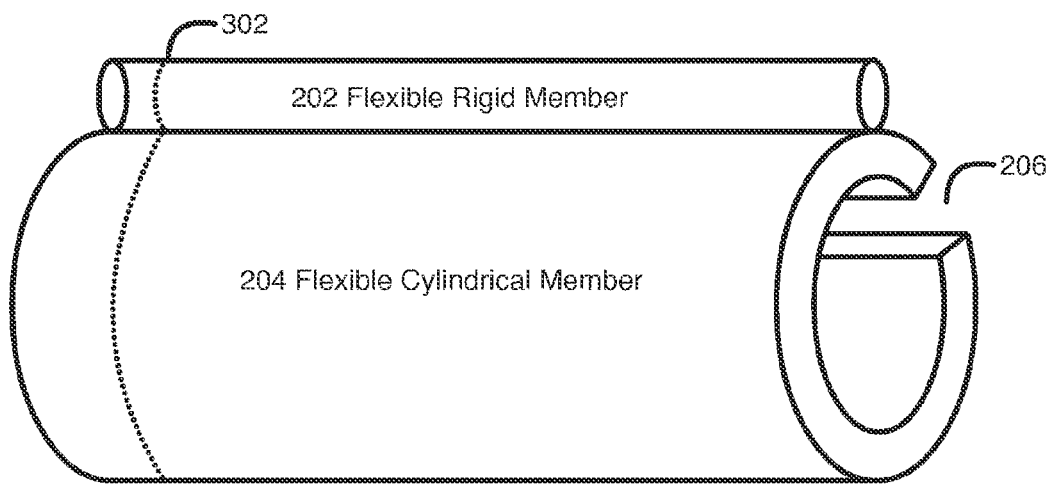
FIG. 3 shows a block diagram of an embodiment of a plant manipulator of FIG. 1 which may be cut to an appropriate length.

FIG. 3 shows a block diagram of an embodiment of a plant manipulator 102, which may be cut to an appropriate length. The embodiment 300 may include a cut 302. The cut 302 may be any kind of cut, which reduces the length of the plant manipulator 102. The cut may be done across both the malleable rigid member 202 and the flexible cylindrical member 204 such that the cut is substantially perpendicular or orthogonal to the long edge of the plant manipulator 102.

In one embodiment, the plant manipulator 102 may be essentially uniform along its length, such that an end user may cut the plant manipulator 102 to a particular length appropriate to hold the plant element 106, without losing the functionality of the original, long plant manipulator 102. The plant manipulator 102 may be long enough such that a number of cuts 302 may be made, making a number of plant manipulators 102 from a longer plant manipulator 102.

Figure 4:
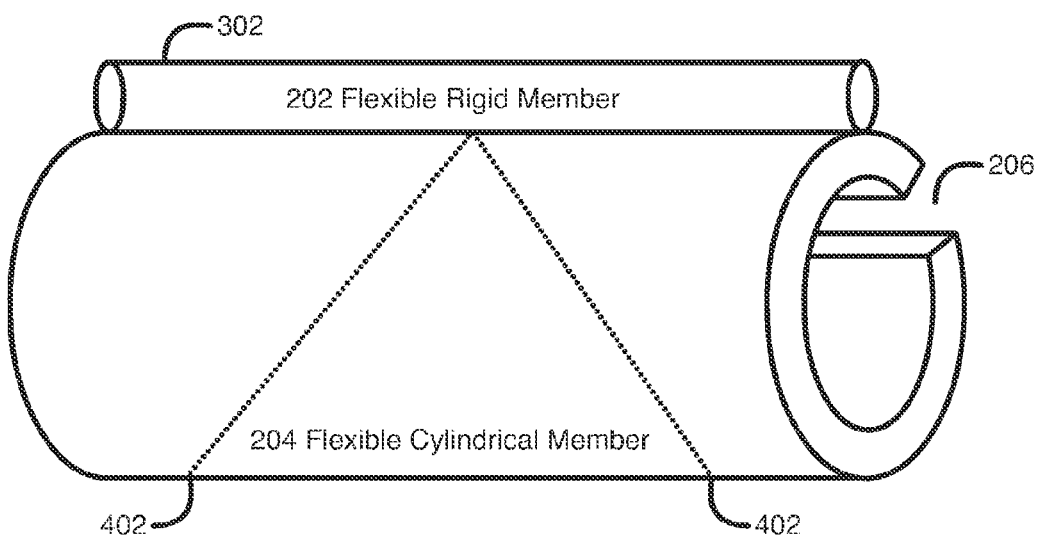
FIG. 4 shows a block diagram of an embodiment of a plant manipulator of FIG. 1 with angular cuts in the flexible cylindrical member 204.

FIG. 4 shows a block diagram of an embodiment of a plant manipulator 102 with angular cut lines in the flexible cylindrical member 204. The embodiment 400 may have angular cut lines 402 to allow the plant manipulator 102 and a plant element 106 manipulated by the plant manipulator 102 to bend with limited kinking of the flexible cylindrical member 204. The angle of each of the cuts 402 may be any angle from 0.0001-90 degrees with respect to the junction of the malleable rigid member 202 and the flexible cylindrical member 204. With the cut out section removed, the flexible cylindrical member may be free to bend with a plant element 106 at any angle from 0.0001-330 degrees. In one embodiment, the plant manipulator 102 may have illustrations of different cuts for different angles on the flexible cylindrical member 204. For example, the cylindrical member 204 may have lines illustrating cuts to be made in order to make particular angles by drawing lines and indicating next to the lines which cuts correlate to which angles. In other embodiments, the plant manipulator 102 may not have all of the elements listed and/or may have other elements in addition to or instead of those listed.

Figure 5:
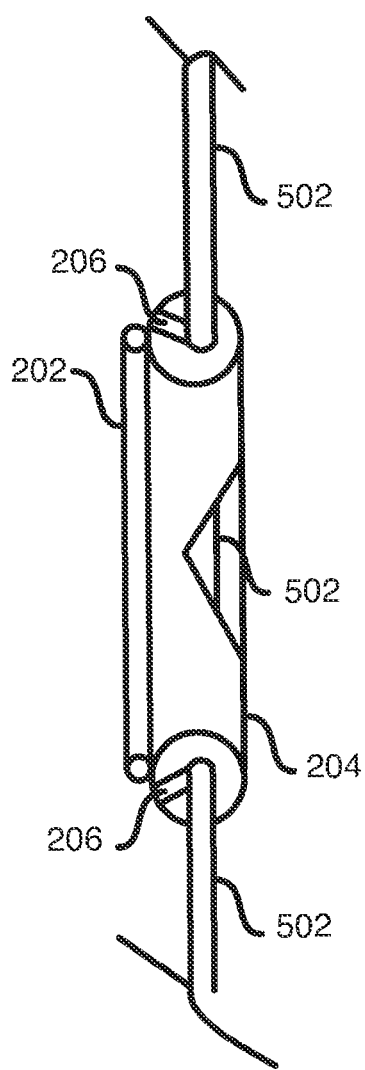
FIG. 5 shows a block diagram of an embodiment of plant manipulator of FIG. 1 with a plant element 502 in the flexible cylindrical member of FIG. 2.

FIG. 5 shows a block diagram of a plant manipulator 500. FIG. 5 shows plant element 502. Embodiment 500 may include a first end 504 and a second end 506. In other embodiments, the plant manipulator 500 may not have all of the elements listed and/or may have other elements in addition to or instead of those listed.

Plant manipulator 500 of plant manipulator 102. First end 504 is the first end of the plant manipulator 500. Second end is a second end of the plant manipulator 500. Plant element 502 is placed in the portions of the flexible cylindrical member 204 that are now first end 504 and second end 506. The plant manipulator 500 may grip a plant element 502 via the first end 504, and the second end 506.

In order to place the plant element 502 in the cylindrical member, the user may first place the plant element 502 in the first end of the plant manipulator 504 and then place a different part of the plant element in the second end of the plant manipulator 506. The plant element 502 may be an embodiment of the plant element 106.

Figure 6:
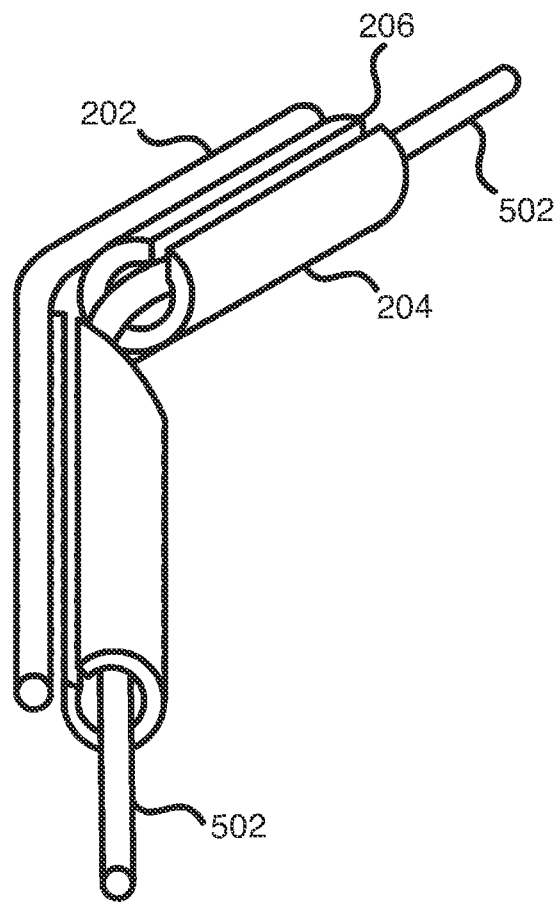
FIG. 6 shows a block diagram of an embodiment of a plant manipulator (of FIG. 1) with a plant element (of FIG. 1) in a bent confirmation.

FIG. 6 shows a block diagram of an embodiment of a plant manipulator 102 with a plant element 106 in a bent confirmation. The embodiment 600 shows the plant manipulator 102 having been bent with the plant element 502 inside the plant manipulator 102. The malleable rigid member 202 may be sufficiently rigid such that after the plant manipulator 102 is bent with the plant element 502, both the plant element 502 and the flexible member 102 retain a bent configuration until a user applies pressure to change the confirmation of the plant element 502 and the plant manipulator 102.

Figure 7:
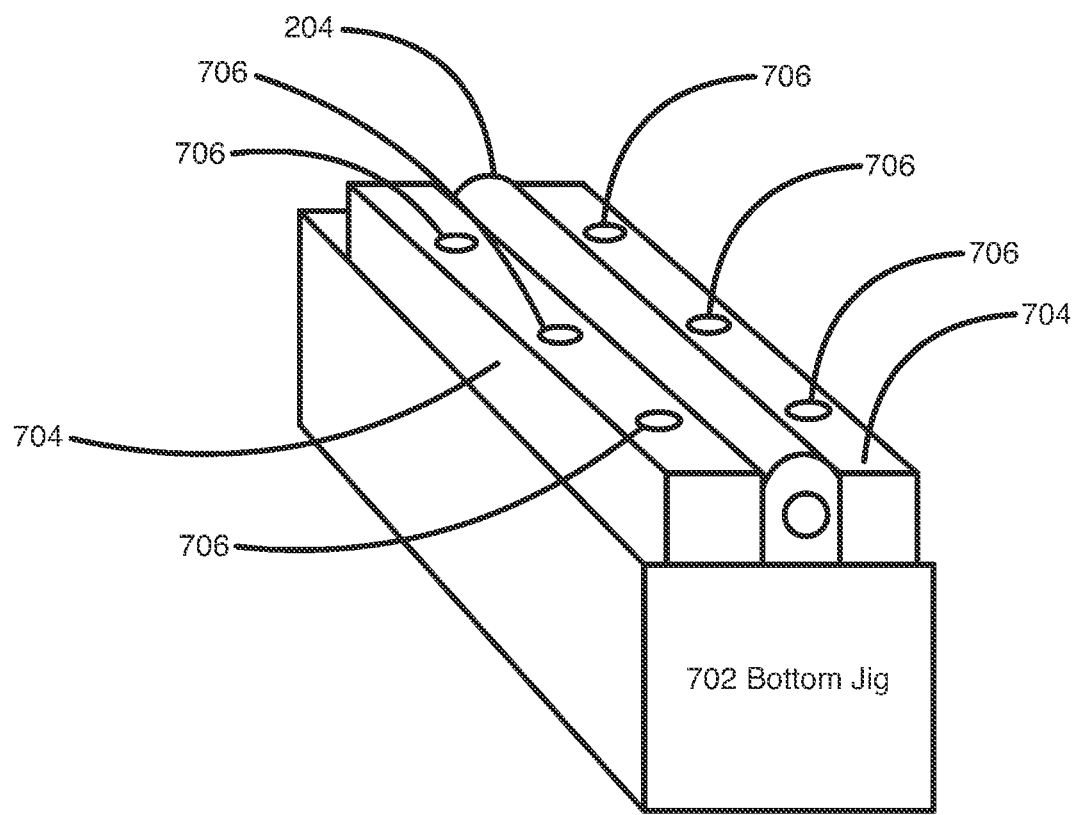
FIG. 7 shows a block diagram of an embodiment of a plant manipulator (of FIG. 1) assembly device.

FIG. 7 shows a block diagram of an embodiment 700 of a plant manipulator 102 assembly device. The embodiment 700 may include a bottom jig 702, support rods 704 and a plurality of screws 706. In other embodiments, the plant manipulator assembly device 700 may not have all of the elements listed and/or may have other elements in addition to or instead of those listed.

The bottom jig 702 is a device which holds the flexible cylindrical member 204 during assembly of the plant manipulator 102. Support rods 704 help hold cylinder member 204 in one place. The bottom jig 702 and the support rods 704 may be an elongate block of any material, including for example, wood, metal, and plastic. The bottom jig 702 may be coupled to support rods 704 in order to hold the flexible cylindrical member 204 in place during assembly. The support rods 704 may be coupled or affixed to the bottom jig 702 using screws 7066. The bottom jig 702 may be any length and may be able to complement a number of top jigs in an assembly in order to create multiple plant manipulators 102 in the same bottom jig 702. In one embodiment, the bottom jig 702 may be 78 inches long, one inch tall and one and an eighth inches wide. The size of the bottom jig 702 will differ depending on the size of the plant manipulator 102 to be fabricated. In one embodiment, the support rods 704 may be quarter inch by quarter inch by 6 inches long. There may be a number of support rods 704 in one cut section.

Figure 8:
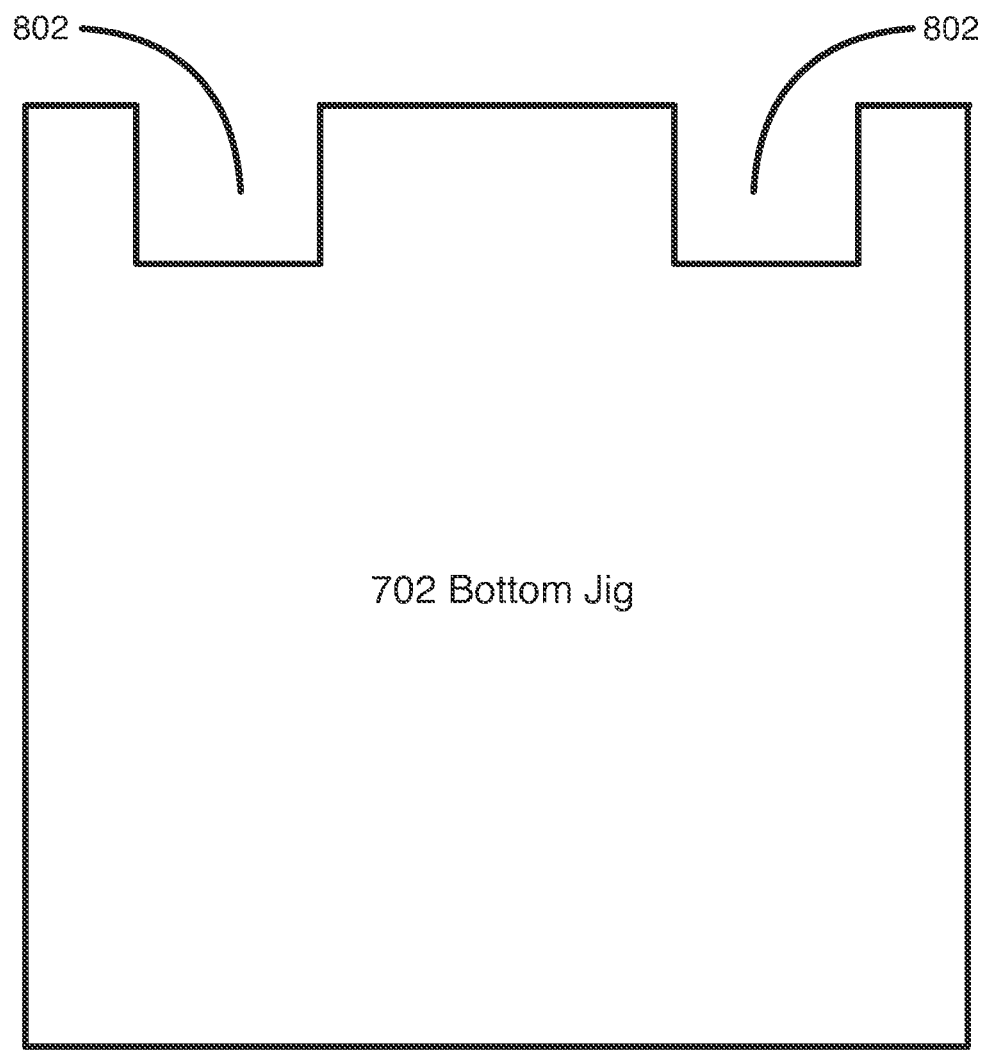
FIG. 8 shows a block diagram of an embodiment of the bottom jig 702 of FIG. 7.

FIG. 8 shows a block diagram of an embodiment 800 of the bottom jig 702. In embodiment 800, the bottom jig 702 includes dado cuts 802. In other embodiments, the bottom jig 702 may not have all of the elements listed and/or may have other elements in addition to or instead of those listed.

The bottom jig 702 may better secure the support rods 704 if the rods are placed in recesses within the bottom jig 702. One may cut the recesses in any shape including a dado. The dados 802 may be able to accommodate the rods 704. In one embodiment, the dados 802 may be a quarter inch in width and a sixteenth of an inch in depth.

Figure 9:
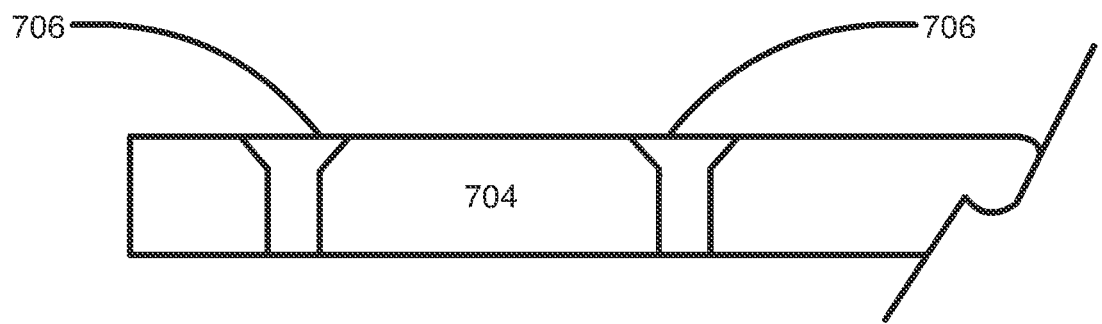
FIG. 9 shows a side view of an embodiment of a support rod of FIG. 7.

FIG. 9 shows a side view of an embodiment of a support rod 704. The embodiment 900 may show a side view of the holes in which the screws 706 may be used to affix the support rod 704 to the bottom jig 702. In other embodiments, the support rod 704 may not have all of the elements listed and/or may have other elements in addition to or instead of those listed. In one embodiment, the support rods 402 may be of aluminum and may be coupled to the bottom jig 702 using screws.

Figure 10:
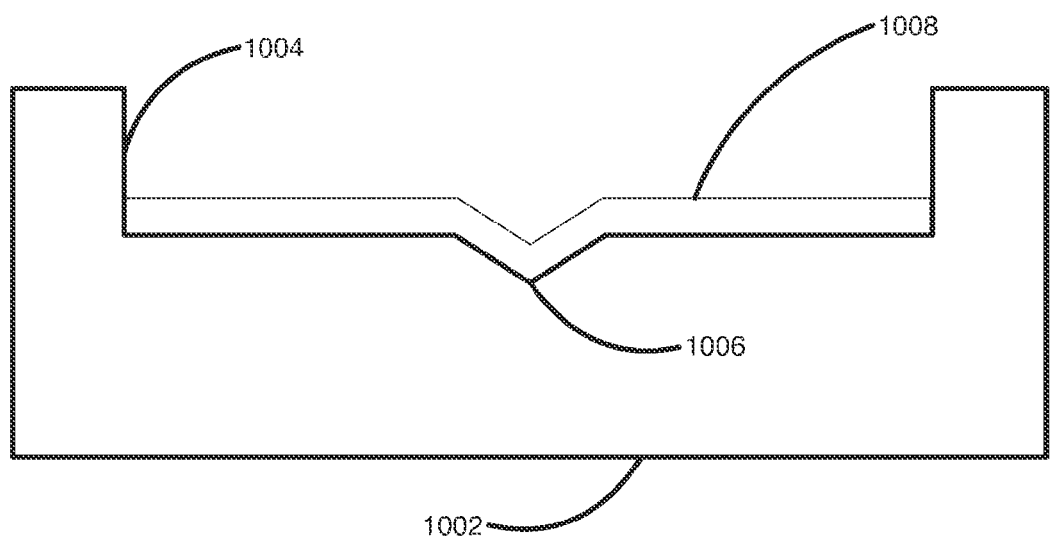
FIG. 10 shows a block diagram of an embodiment of a plant manipulator assembly device.

FIG. 10 shows a block diagram of an embodiment of an apparatus 1000 of a device for assembling a plant manipulator assembly device. Apparatus 1000 may include a top jig 1002, a dado 1004, a recess 1006, and an adhesive guard 1008. In other embodiments, the plant manipulator assembly device 1000 may not have all of the elements listed and/or may have other elements in addition to or instead of those listed.

The top jig 1002 is a plant manipulator assembly device, which situates the malleable rigid member 202 for adhesion to the cylindrical flexible member 204. The top jig 1002 may have a dado 1004 cut out. Within the dado 1004, there may be a recess 1006 for securing the malleable rigid member 202. Recess 1006 may be a V shaped groove. The dado 1004 may be covered with an adhesive guard 1008, which may guard the top jig 1002 from the adhesive used to bind the cylindrical flexible member 204 and the malleable rigid member 202. The adhesive guard 1008 may be permanent or disposable after each use or a number of uses. In one embodiment, the adhesive guard 1008 is a piece of tape.

In one embodiment, the top jig 1002 may be cut from a one and a quarter inch by thirteen sixteenths of an inch wooden block, which may be cut to twenty-four inches long. The dado 1004 may be an area with a cross section of three sixteenths of an inch by three quarters of an inch. The recess 1006 may be of any size appropriate to hold the malleable rigid member. For instance, a malleable rigid member 202 with a one-inch diameter may have a groove 1006, which is a quarter of an inch deep, exposing three quarters of the diameter of the malleable rigid member 202 when the malleable rigid member 202 is situated in the top jig 1002.

Figure 11:
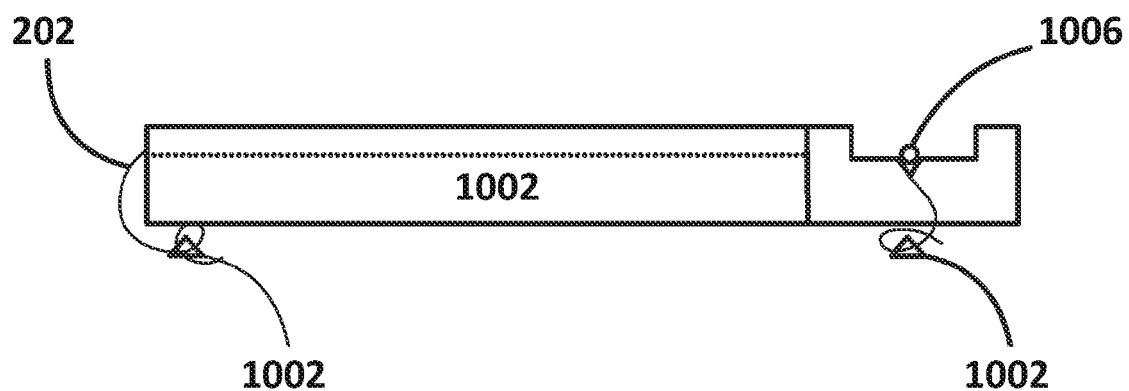
FIG. 11 shows a block diagram of an embodiment of a top jig FIG. 10 with a malleable rigid member FIG. 2 situated in the recess FIG. 10.

FIG. 11 shows a block diagram of an embodiment of a top jig 1002 with a malleable rigid member 202 situated in the recess 1006. In other embodiments, the top jig 1002 may not have all of the elements listed and/or may have other elements in addition to or instead of those listed.

The embodiment 1100 may include a malleable rigid member anchor ("anchor") 1102. The anchor 1102 is a device, which prevents the malleable rigid member 202 from moving during assembly of the plant manipulator 102. The anchor 1102 may be coupled to the top jig 1002 at either or both ends. In one embodiment, the malleable rigid member 202 is a wire which may be placed in the groove 1006 of a top jig 1002 and wound around and optionally tied to anchors 1102 situated at each end of the elongate top jig 1002. The wire may be tightened such that the wire does not move during assembly of the plant manipulator 102.

Figure 12:
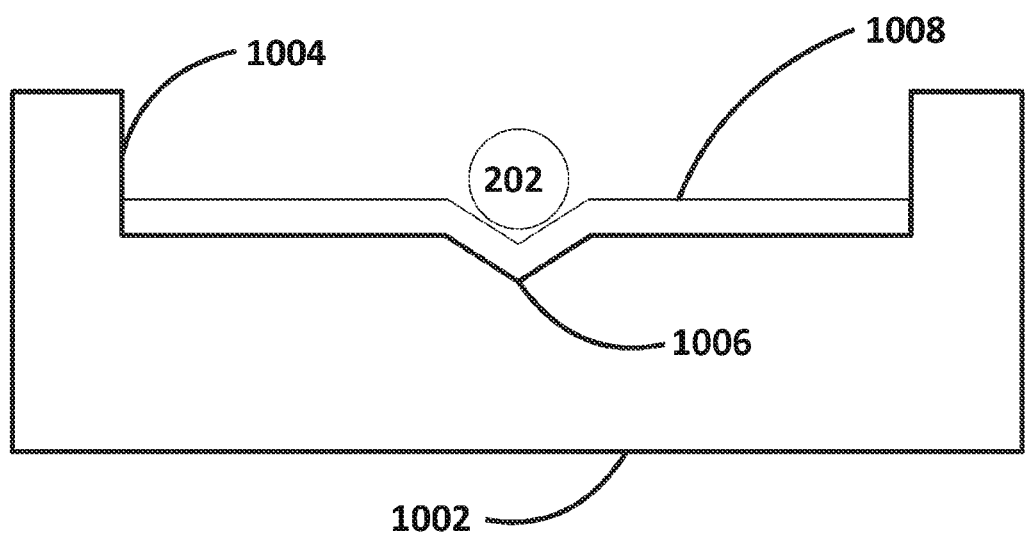
FIG. 12 shows a block diagram of an embodiment of a top jig FIG. 10 with a malleable rigid member FIG. 2.

FIG. 12 shows a block diagram of an embodiment of a top jig 1002 with a malleable rigid member 202. FIG. 12 may include a top jig 1002, a dado 1004, a groove 1006 and an adhesive guard 1008. In other embodiments, the top jig 1002 may not have all of the elements listed and/or may have other elements in addition to or instead of those listed.

The malleable rigid member 202 may be situated above the adhesive guard 1008 in the groove 1006 within the dado 1004 of the top jig. Adhesive may be applied on top of the malleable rigid member 202 in order to couple the malleable rigid member 202 to the cylindrical flexible member 204.

Figure 13:
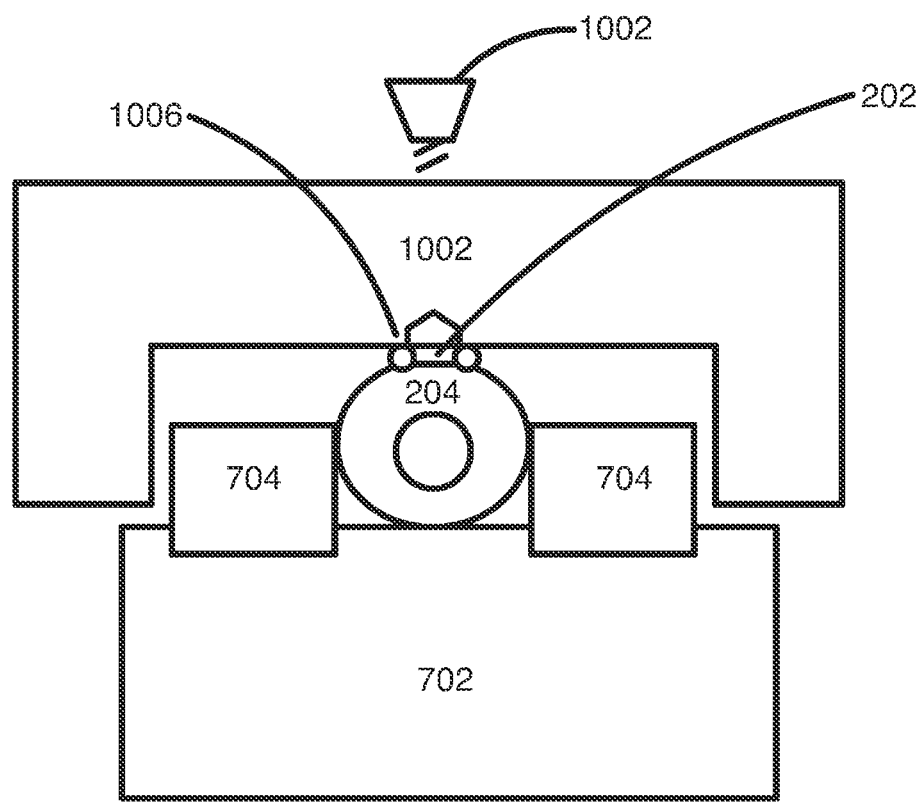
FIG. 13 shows a block diagram of an embodiment of an assembly of a top jig FIG. 10 and a bottom jig 702 of FIG. 7 in order to make a plant manipulator.

FIG. 13 shows a block diagram of an embodiment of an assembly 1300 of a top jig 1002 and a bottom jig 702 in order to make a plant manipulator. The assembly 1300 may include a malleable rigid member 202, flexible cylindrical member 204, a bottom jig 702, support rods 704, a top jig 1002, a groove 1006, an anchor 1102, and an adhesive 1302. In other embodiments, the assembly 1300 may not have all of the elements listed and/or may have other elements in addition to or instead of those listed.

The adhesive 1302 may be any substance which can be used to bind two objects, for example, crazy glue, super glue, epoxy, other polymeric glues, wood glue, and the like.

The assembly 1300 may be formed by placing the flexible cylindrical member 204 in the bottom jig 702 between the support rods 704, placing the malleable rigid member 202 in the groove 1006, potentially over an adhesive guard 1008, placing an adhesive 1302 on either of or both of the flexible cylindrical member 204 and/or the malleable rigid member 202, and combining the top jig 1002 with the bottom jig 702 in an assembly. The assembly may be held together during the setting of an adhesive in order to better keep the assembly together. The assembly may be heated in order to increase the adhesive effect of the adhesive 1302.

Figure 14:
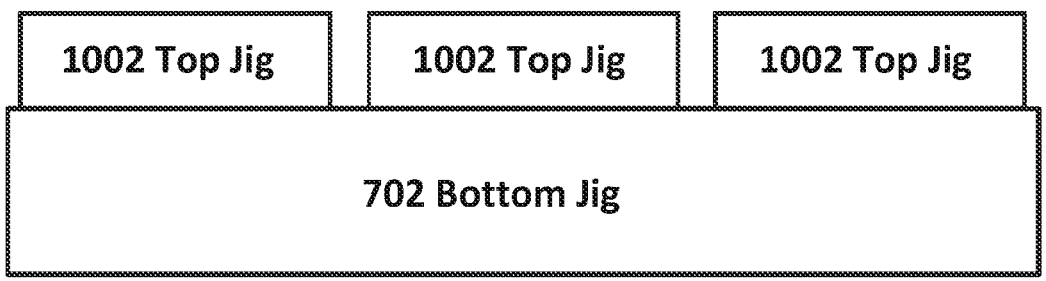
FIG. 14 shows a block diagram of an embodiment of an assembly for making a plant manipulator FIG. 1.

FIG. 14 shows a block diagram of an embodiment of an assembly for making a plant manipulator 102. The embodiment 1400 may have multiple top jigs 1002 assembled with a single bottom jig 702. In other embodiments, the assembly 1400 may not have all of the elements listed and/or may have other elements in addition to or instead of those listed.

The bottom jig 702 may be a number of times longer than the top jigs 1002, allowing multiple top jigs 1002 to be assembled with one bottom jig. In one embodiment, the top jigs 1002 are 24 inches long, the bottom jig 702 is 78" long, and three top jigs 1002 are assembled with one bottom jig 702. Any number of top jigs 1002 may be assembled with any number of bottom jigs 702.

Figure 15:
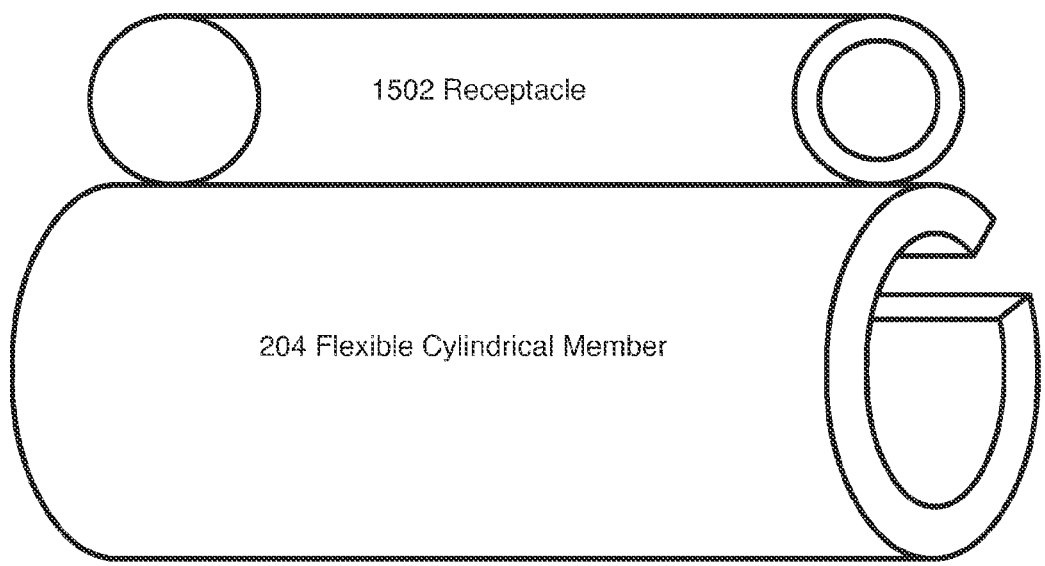
FIG. 15 shows a block diagram of an alternative embodiment of a flexible cylindrical member FIG. 2.

FIG. 15 shows a block diagram of an intermediate assembly 1500 for making 102. The intermediate assembly 1500 may include a receptacle 1502. The receptacle 1502 is a device configured to receive a malleable rigid member. The receptacle 1500 may be coupled to the flexible cylindrical member 204. The intermediate assembly 1500 may be of any length. In one embodiment, the receptacle 1502 is a sixteenth of an inch nylon tube, and the flexible cylindrical member 204 is a quarter inch soaker hose. Nylons are condensation copolymers formed by reacting diamine and dicarboxylic acids, so amides are formed at both ends of each monomer.

Figure 16:
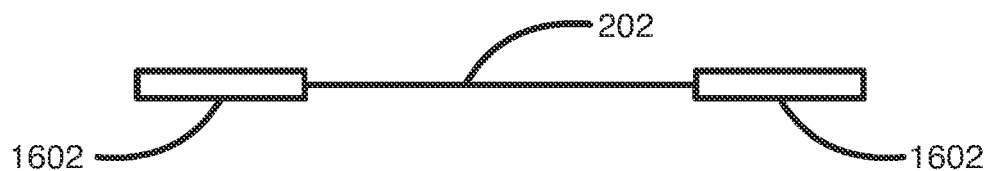
FIG. 16 shows a block diagram of an alternative embodiment of a malleable rigid member FIG. 2.

FIG. 16 shows a block diagram of an alternative embodiment of a malleable rigid member 1600. The malleable rigid member 1600 may include at least one flattened portion 1602. In other embodiments, the malleable rigid member 1600 may not have all of the elements listed and/or may have other elements in addition to or instead of those listed.

The at least one flattened portion 1602 is a flattened portion of the malleable rigid member 1600. The flattened portion 1602 may be flattened by applying force to the malleable rigid member with a substantially planar force applicator. The flattened portion 1602 may be able to fit in the receptacle 1502 coupled to the flexible cylindrical member 204.

Figure 17:
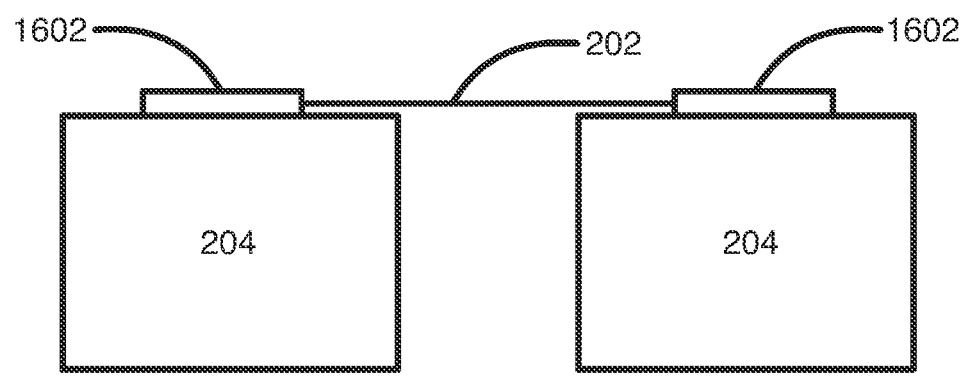
FIG. 17 shows a block diagram of an alternative embodiment of a plant manipulator FIG. 1.

FIG. 17 shows a block diagram of an alternative embodiment of a plant manipulator 102. In one embodiment, a first flattened portion 1602 on one end of a malleable rigid member 202 may be placed in a first receptacle 1502 and a second flattened portion 1602 on another end of a malleable rigid member may be placed in a second receptacle 1502, forming a plant manipulator 102.

Figure 18:
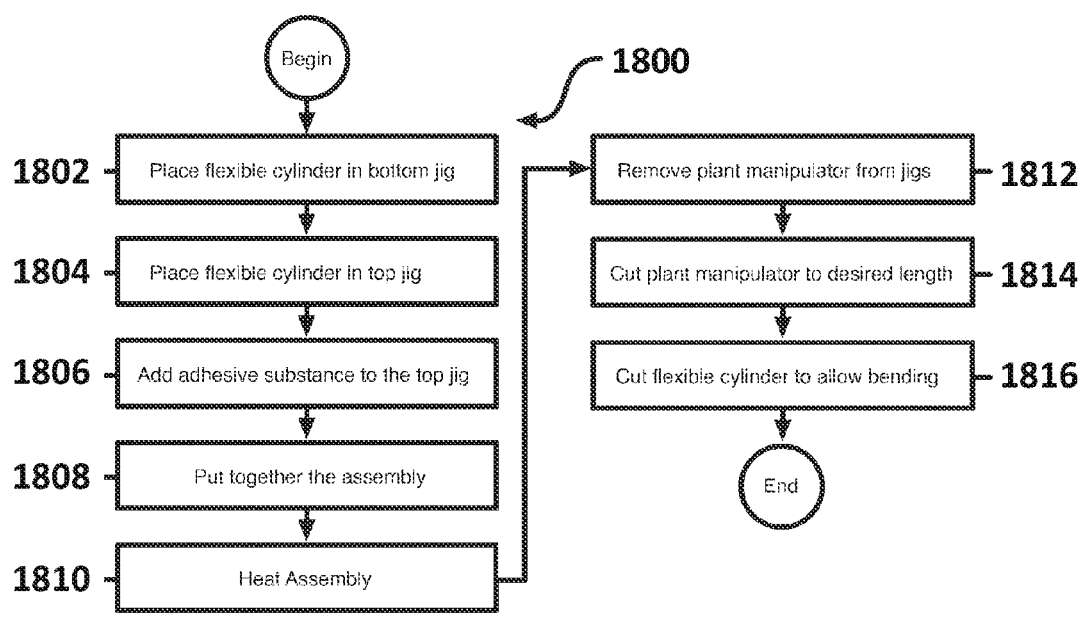
FIG. 18 shows a flowchart of an embodiment of a method for making a plant manipulator FIG. 1.

FIG. 18 shows a flowchart of an embodiment of a method for making a plant manipulator 102. The method 1800 may include steps of place the flexible cylindrical member in the bottom jig 1802, place the malleable rigid member in the top jig 1804, add adhesive substance 1806, put together the assembly 1808, heat the assembly 1810, remove the plant manipulator from the jigs 1812, cut the plant manipulator to desired length 1816, and cut the flexible cylinder to allow bending.

In step 1802, the flexible cylindrical member 204 is placed in the bottom jig 702. The cylindrical member 204 may be situated between the support rods 704. The slit 206 may be cut into the flexible cylindrical member 204 before or after the assembly of the plant manipulator 102. In one embodiment, the top jig 1002 may have anchors 1102 at either end around which one may wrap the ends of the malleable rigid member 202, in order to secure the malleable rigid member 202.

In step 1804, the malleable rigid member 202 may be placed in the top jig 1002. The malleable rigid member 202 may be placed in the groove 1006. An adhesive guard 1008 may be situated between the dado 1004 and the malleable rigid member 202.

In step 1806, an adhesive 1302 is added. The adhesive 1302 may be applied to the exposed surface of the malleable rigid member 202 when situated in the top jig 1002. The adhesive 1302 may also be applied to the exposed surface of the flexible cylindrical member 204 when situated in the bottom jig 702. The adhesive may be applied to either or both of the exposed surfaces of the flexible cylindrical member 204 or the malleable rigid member 202. In one embodiment, the adhesive is colored to match the colors of the malleable rigid member 202 and the flexible cylindrical member 204. In one embodiment, the agent used to color the glue is Burnt Bone Powder, which may give the adhesive a grey color. In another embodiment, the adhesive may be colored with paint after the adhesive sets.

In step 1808, the assembly of the top jig 1002 and the bottom jig 702 is assembled and secured. The assembly may force the adhesive 1302 to bind the flexible cylindrical member 204 to the malleable rigid member 202. The assembly may be secured with a wrapper around the jigs 1002 and bottom jig 702 in order to compel the adhesion of the malleable rigid member 202 to the flexible cylindrical member 204. In one embodiment, the wrapper is a hollow, cylindrical tube with a slit, where the assembly of the top jig 1002 and the bottom jig 702 fit in the slit and are held together by the interior of the hollow cylindrical tube. In another embodiment, the wrapper is shrink-wrap wrapped around the assembly. The malleable rigid member 202 and the flexible cylindrical member 204 may be coupled such that the long edge of the flexible cylindrical member 204 and the long edge of the malleable rigid member 202 run parallel to one another.

In step 1810, the assembly of jigs 1002 and bottom jig 702 are heated. Heating may allow the adhesive 1302 to more quickly and effectively bind the malleable rigid member 202 to the flexible cylindrical member 204. In one embodiment, the heating is done in an oven. In one embodiment, the oven is a wooden box with a hinged lid and 200 watt light bulbs. In one embodiment, the heat may be applied to the flexible cylindrical member 204 made of a polymer before the assembly is made to increase adhesive properties of the polymer of the flexible cylindrical member 204.

In step 1812, the plant manipulator 102 is removed from the jig 1002 and bottom jig 702. The assembly may be disassembled. The plant manipulator may be removed from the jigs 1002 and bottom jig 702. The plant manipulator 102 may be ready for sale or distribution when the plant manipulator is removed from the assembly, or the plant manipulator may undergo further processing in steps 1814, 1816, 1818, or 1820.

In step 1814, more adhesive is added to the plant manipulator 102. In one embodiment, the malleable rigid member 202 may be entirely encased in adhesive, creating an adhesive layer surrounding the malleable rigid member 202. The extra layer of adhesive 1302 may improve the coupling of the malleable rigid member 202 and the flexible cylindrical member 204. One need not reheat the plant manipulator 102 after the extra adhesive 1302 is added, but one may do so.

In step 1816, the plant manipulator 102 or some of the components of the plant manipulator 102 are painted. In one embodiment, the entire plant manipulator 102 may be painted a particular color. In another embodiment, the user may only paint the adhesive 1302 and any exposed elements of the malleable rigid member 202. In still another embodiment, the malleable rigid member 202 is entirely encased in adhesive 1302, the paint may be only applied to the adhesive 1302.

In step 1818, the plant manipulator 102 may optionally be cut to particular lengths. Different commercial factors may influence the final product length, for instance, the types of plants for which the device is being used or the age of plants for which the plant manipulator 102 is being used. Step 1814 may be performed before or after the product is sold by a manufacturer, distributor, retailer, and end-user.

In step 1820, the flexible cylindrical member 204 may optionally be cut with particular cuts 402 at particular angles to allow better bending. The angle of each of the cuts 402 may be any angle from 0.1-90 degrees with respect to the junction of the malleable rigid member 202 and the flexible cylindrical member 204. With the cut out section removed, the flexible cylindrical member may be free to bend with a plant element 106 at any angle from 0.0001-330 degrees. The cuts 402 may be made by a manufacturer, distributor, retailer, and/or end-user.

In an embodiment, each of the steps of the method shown in FIG. 18 is a distinct step. In another embodiment, although depicted as distinct steps in FIG. 18, steps 1802-1820 may not be distinct steps. In other embodiments, the method shown in FIG. 18 may not have all of the above steps and/or may have other steps in addition to or instead of those listed above. The steps of the method shown in FIG. 18 may be performed in another order. Subsets of the steps listed above as part of the method shown in FIG. 18 may be used to form their own method.

Figure 19:
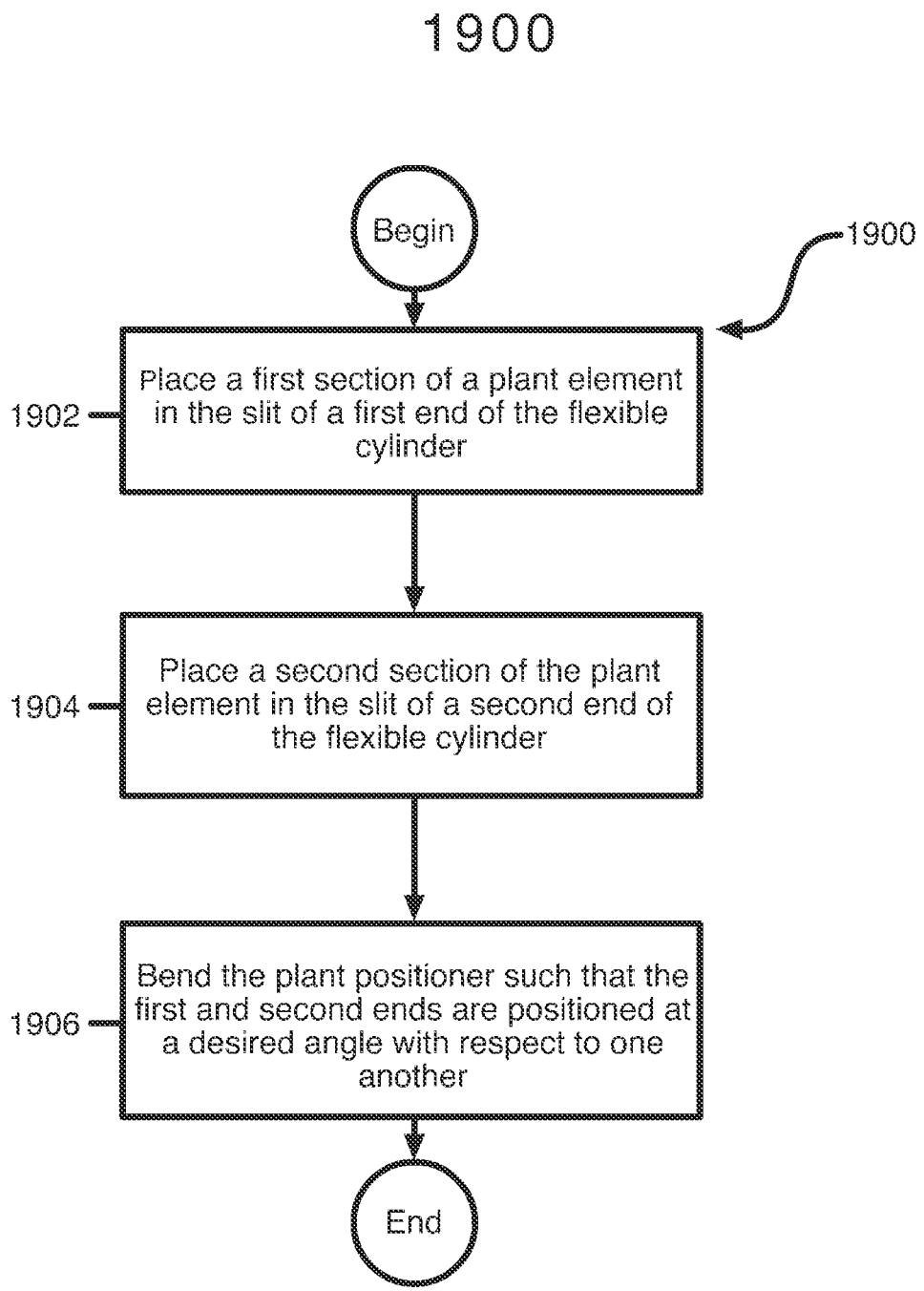
FIG. 19 shows a flowchart of an embodiment of a method for using the plant manipulator FIG. 1.

FIG. 19 shows a flowchart of an embodiment of a method for using the plant manipulator 102. The method 1900 may include steps of place a first section of a plant element in the slit of a first end of the flexible cylinder 1902, place a second section of the plant element in the slit of a second end of the flexible cylindrical member 1904, and bend the plant manipulator such that the first and second ends are position at a desired angle with respect to one another 1906.

In step 1902, a first section of the plant element 106 may be placed in the slit 206 of the flexible cylindrical member 204 of a first end of the plant manipulator 102.

In step 1904, a second section of the plant element is placed in the slit 206 of the flexible cylindrical member 204 of a second end of the plant manipulator.

In step 1906, the plant manipulator 102 is bent such that the first and second ends of the plant manipulator 102 are positioned at a desired angle with respect to one another. When the plant element 106 is secured in the plant manipulator 102, the plant element 106 may conform substantially to the angle at which the plant manipulator is bent. The desired angle may be any angle at which one would like to bend a plant. In one embodiment, the desired angle may range from 5 degrees to 175 degrees.

In one embodiment, the plant element 106 is a severed plant limb, which may be mended with the use of a plant manipulator 102. The plant manipulator 102 may hold a part of each of the severed plant limb parts in order to reassemble the plant element 106 with the severed plant limb.

In one embodiment, either or both of steps 1814 and 1816 may be conducted after step 1906.

In an embodiment, each of the steps of the method shown in FIG. 19 is a distinct step. In another embodiment, although depicted as distinct steps in FIG. 19, steps 1902-1906 may not be distinct steps. In other embodiments, the method shown in FIG. 19 may not have all of the above steps and/or may have other steps in addition to or instead of those listed above. The steps of the method shown in FIG. 19 may be performed in another order. Subsets of the steps listed above as part of the method shown in FIG. 19 may be used to form their own method.

Figure 20:
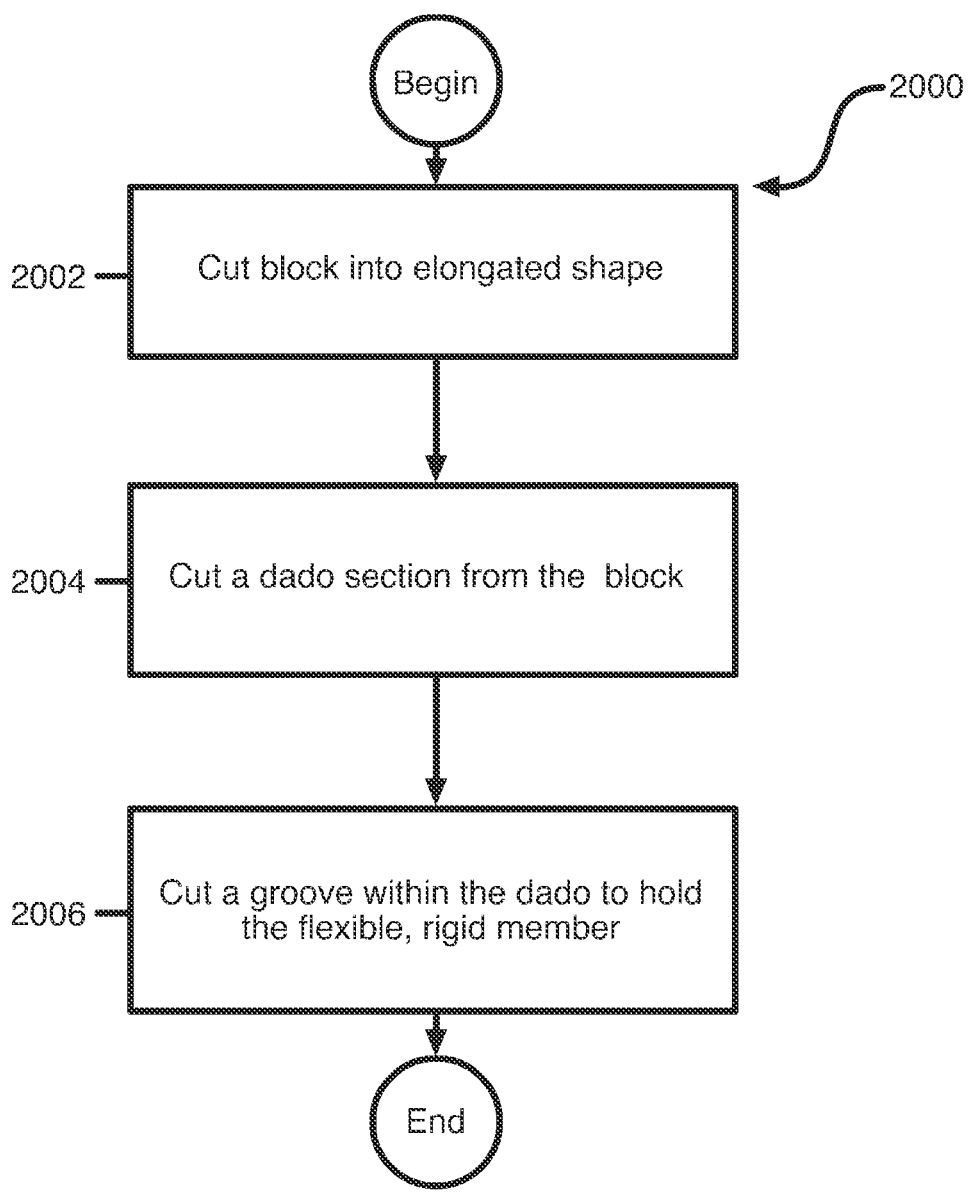
FIG. 20 shows a flowchart of an embodiment of a method for making a top jig FIG. 7.

FIG. 20 shows a flowchart of an embodiment of a method for making a top jig 706. The method 2000 may include steps of cut a block into an elongate shape 2002, cut a dado 1004 section from the block 2004, cut a groove 1006 within the dado 1004 to hold the malleable rigid member.

In step 2002, an elongate block is cut. The block may be of any substance including wood, metal, and/or plastic, for example. The block may be cut into an elongate shape. In one embodiment, the block may be a wooden block, which is cut into a 24 inch by one and a quarter inches by three sixteenths of an inch, rectangular prism shape.

In step 2004, a dado 1004 is cut into the elongate block. In one embodiment, the top jig 1002 may be cut from a one and a quarter inch by thirteen sixteenths of an inch wooden block, which may be cut to twenty-four inches long. The dado 1004 may be an area with a cross section of three sixteenths of an inch by three quarters of an inch.

In step 2006, a groove 1006 is cut within the dado 1004. The groove 1006 may be of any size appropriate to hold the malleable rigid member. For instance, a malleable rigid member 202 with a one-inch diameter may have a groove 1006, which is a quarter of an inch deep, exposing at least three quarters of the diameter of the malleable rigid member 202 when the malleable rigid member 202 is situated in the top jig 1002.

In step 2008, an anchor is coupled to each end of the top jig. In one embodiment, the anchor 1102 may be a screw. The anchors 1102 may be coupled to each end such that a malleable rigid member 202 may be wrapped around the anchors 1102.

In an embodiment, each of the steps of the method shown in FIG. 20 is a distinct step. In another embodiment, although depicted as distinct steps in FIG. 20, steps 2002-2008 may not be distinct steps. In other embodiments, the method shown in FIG. 20 may not have all of the above steps and/or may have other steps in addition to or instead of those listed above. The steps of the method shown in FIG. 20 may be performed in another order. Subsets of the steps listed above as part of the method shown in FIG. 20 may be used to form their own method.

Figure 21:
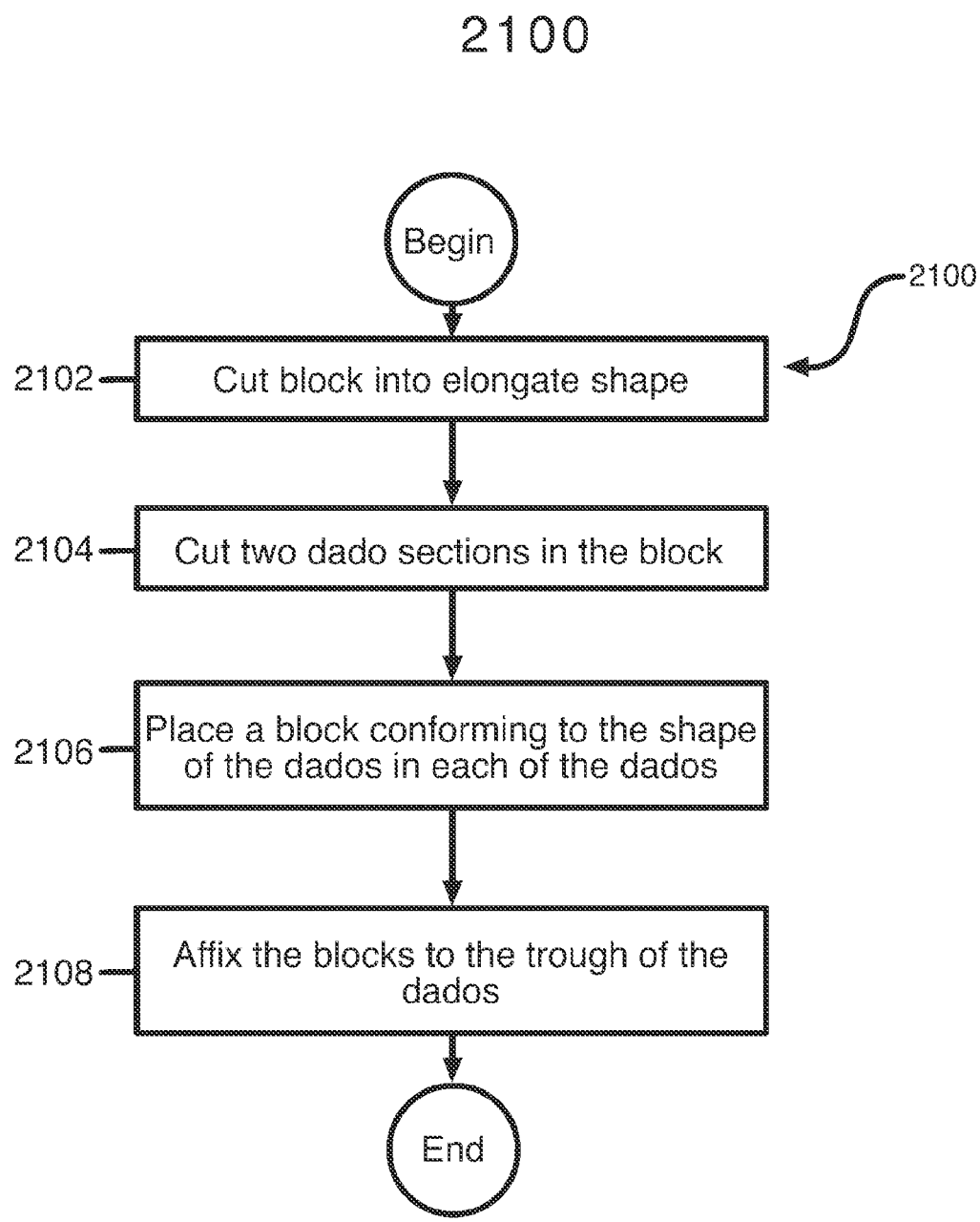
FIG. 21 shows a flowchart of an embodiment of a method for making a bottom jig 702 FIG. 7.

FIG. 21 shows a flowchart of an embodiment of a method for making a bottom jig 702. The method 2100 may include steps of cut a block into an elongated shape 2102, cut two dados in the block 2104, place a support rod in each of the cut sections 2106, and affix the blocks to the trough of the cut sections 2108.

In step 2102, an elongate block is cut. The block may be of any substance including wood, metal, and plastic, for example. The block may be cut into an elongate shape. In one embodiment, the block is a wooden block, which is cut into a 78 inch by one inch by one and an eighth inch rectangular prism shape.

In step 2104, the block has two recesses cut from the block. The interior of the recesses or cut sections 802 may substantially conform to the support rods 402. In one embodiment, the recesses may be cut along the length of the bottom jig, parallel to one another on the same side of the block and the length of the long edge of the block. The cut sections 802 may be a quarter of an inch wide by a sixteenth of an inch deep, which may allow the support rods to be partially embedded in the bottom jig 702.

In step 2106, support rods 402 are placed in the cut sections 802.

In step 2108, the support rods 402 are affixed to the trough of the cut sections 802. The support rods may be affixed by any adhesive or physical restriction method including, for example, gluing, nailing or screwing the support rods to the trough of the cut sections 802 of the bottom jig 702. In one embodiment, the support rods 402 may be of quarter inch by quarter inch by six inch elongate blocks of aluminum and may be coupled to the bottom jig 702 using screws.

In an embodiment, each of the steps of the method shown in FIG. 21 is a distinct step. In another embodiment, although depicted as distinct steps in FIG. 21, steps 2102-2108 may not be distinct steps. In other embodiments, the method shown in FIG. 21 may not have all of the above steps and/or may have other steps in addition to or instead of those listed above. The steps of the method shown in FIG. 21 may be performed in another order. Subsets of the steps listed above as part of the method shown in FIG. 21 may be used to form their own method.

Figure 22:
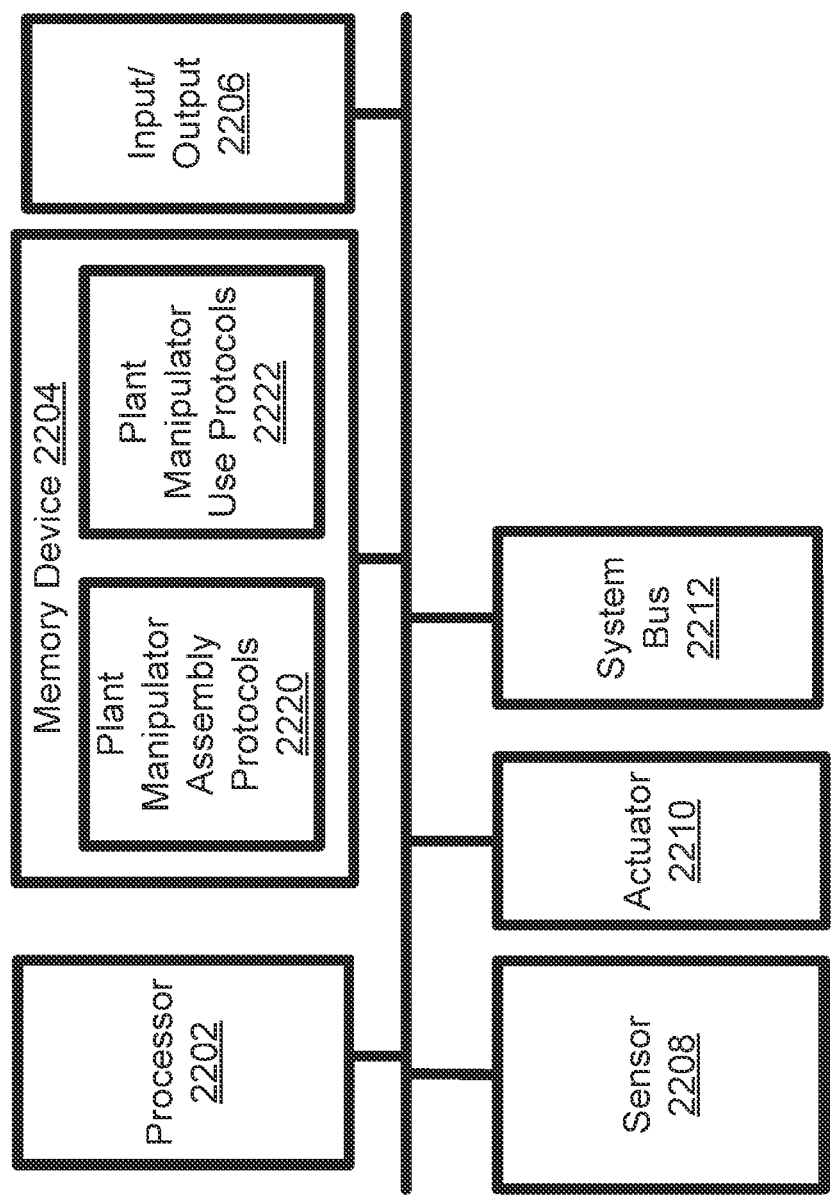
FIG. 22 shows a block diagram of an embodiment of a computer.

FIG. 22 shows a block diagram of an embodiment of a computer. The computer 2200 may include a processor 2202, a memory device 2204, an input output 2206, a sensor 2208, an actuator 2210, a system bus 2212, plant manipulator assembly protocols 2220, and plant manipulator use protocols 2222. In other embodiments, the computer 2200 may not have all of the elements listed and/or may have other elements in addition to or instead of those listed.

The processor 2202 is a device used to process commands stored in the memory device 2204. The processor 2202 may include any one of, some of, any combination of, or all of multiple parallel processors, a single processor, a system of processors having one or more central processors, a logic circuit, a hardwire and/or one or more specialized processors dedicated to specific tasks.

The memory device 2204 may include, for example, any one of, some of, any combination of, or all of a long term storage system, such as a hard drive; a short term storage system, such as a random access memory. The memory may include, for example, read-only memory ("ROM"), random access memory ("RAM"), erasable programmable read only memory ("EPROM"), electrically erasable programmable read only access memory ("EEPROM"), a dedicated state logic circuit, flash, non-volatile random access memory ("NVRAM"). In an embodiment, the memory device 2204 may include a removable storage system such as a disk drive, floppy drive or a removable drive; and/or flash memory. The memory device 2204 may include one or more machine-readable media that may store a variety of different types of information. The term machine-readable media may be used to refer to any non-transient medium capable of carrying information that is readable by a machine. One example of a machine-readable medium is a computer-readable medium. The memory device 2204 may also store variables, intermediates, results, constants, and the like necessary to execute functions. For instance, the memory device 2204 may store commands to be executed by the processor 2202 in order to perform functions.

Functions to be executed by the processor 2202 which may be stored in the memory 2204 may include plant manipulator assembly protocols 2220 and plant manipulator use protocols 2222. Plant manipulator assembly protocols 2220 give instructions for automated assembly steps. The plant manipulator assembly protocols 2220 may instruct the processor 2202 to take actions to assemble the plant manipulator 102. The plant manipulator assembly protocols 2220 may include, for example, any of the steps in the embodiment of methods from FIGS. 18, 20, and 21.

The plant manipulator use protocols 2222 give instructions for automated use of the plant manipulator 102. Plant manipulator use protocols 2222 give instructions for automated assembly steps. The plant manipulator use protocols 2222 may instruct the processor 2202 to take actions to assemble the plant manipulator 102. The plant manipulator use protocols 2220 may automate, for example, any of the steps in the embodiment of methods from FIG. 19.

The input/output device 2206 is a device capable of communicatively coupling useful components to a computerized or hardwired system. The input/output device 2206 may be one unit or may represent separate input and output devices. The output element of the input/output device 2206 may include any one of, some of, any combination of, or all of a sensor 2208, an actuator 2210, display system, a speaker system, a connection or interface system to a sound system, an interface system to peripheral devices and/or a connection and/or a interface system to a computer system, intranet, and/or internet, and the like. The device output system may include a monitor and/or other output device.

The input element of the input/output device 2202 may include connections and hardware for any of, some of, any combination of, or all of a sensor 2208 actuator 2210, a transceiver, a keyboard system, an interface to receive secured data, a mouse system, a track ball system, a track pad system, buttons on a handheld system, a scanner system, a microphone system, a touchpad system, and/or a connection and/or interface system to a computer system, intranet, and/or internet (e.g., IrDA, USB), and the like.

The sensor 2208 is a device made to detect and measure physical characteristics and output a data stream. The sensor may detect whether steps from the embodiments of methods shown in FIGS. 18-21.

The actuator 2210 is a device for generating a physical change. The actuator 2210 may take actions based on instructions received from the processor 2202, and may perform any of the steps in the embodiments of methods shown in FIGS. 18-21.

The system communication bus 2212 is a medium used to communicatively couple elements of the computer 2200. The communication bus 2212 may couple any, all of, or some of the processor 2202, memory device 2204, input/output device, 2206, sensor 2208, actuator 2210, and any other components which may be coupled physically or communicatively to the computer 2200.

Figure 23:
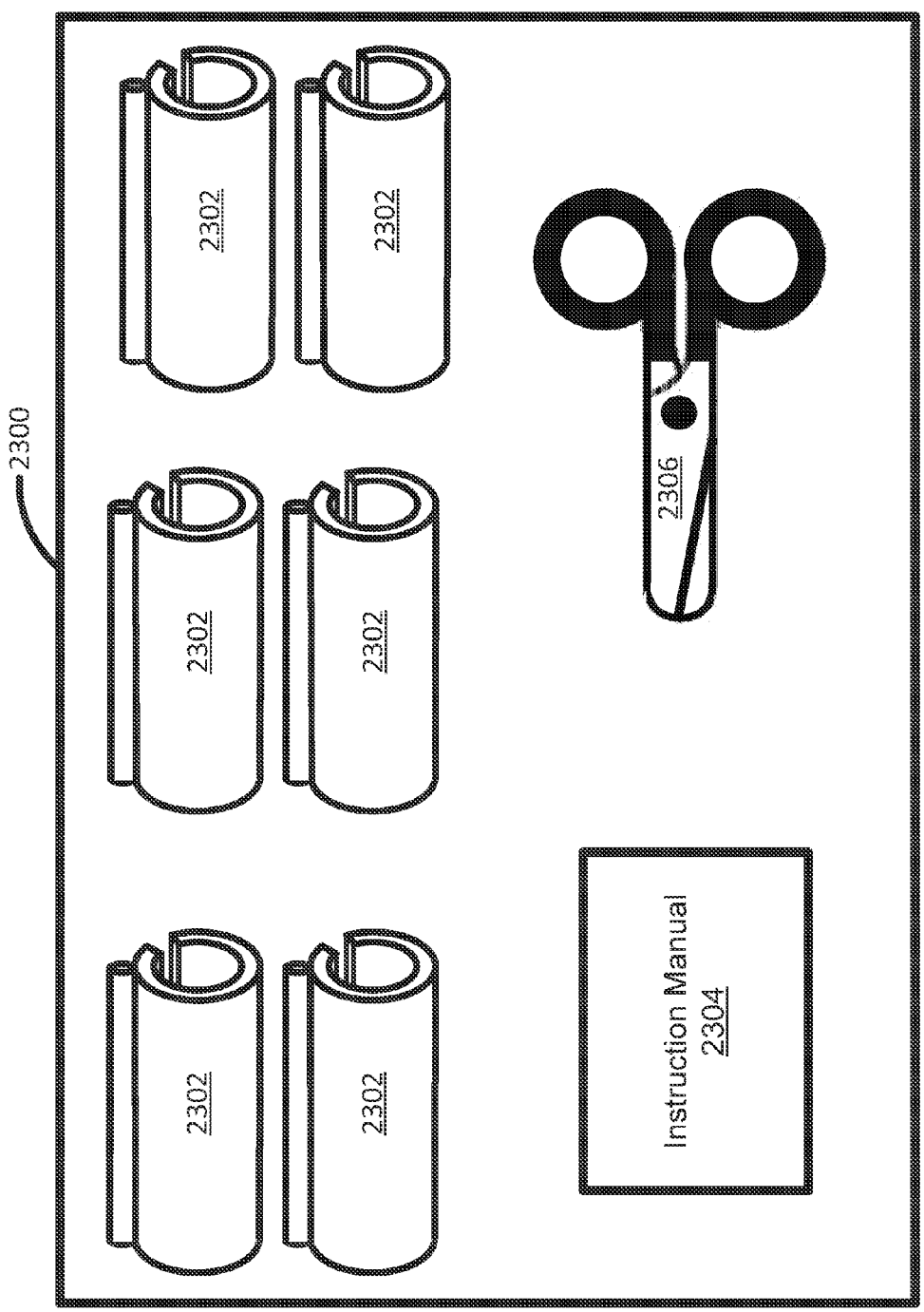
FIG. 23 shows a block diagram of a plant manipulator kit.

FIG. 23 shows a block diagram of a plant manipulator kit. The plant manipulator kit 2300 may include a plurality of plant manipulators 2302, an instruction manual 2304, and a plant manipulator adjuster 2306. In other embodiments, the plant manipulator kit 2300 may not have all of the elements listed and/or may have other elements in addition to or instead of those listed.

The plurality of plant manipulators 2302 may comprise any number of plant manipulators 2302 of any length. For instance, the plant manipulator kit 2302 may include six, single-foot long plant manipulators 2302. The instruction manual is a guide to using and cutting to specification the plant manipulators 2302. The instruction manual 2304 may be of any length and any substance and may even appear on the packaging for the plant manipulator kit 2300. The instruction manual 2304 may include instructions for cutting the flexible cylindrical member 204 to specific angles or for cutting the plant manipulators 2302 to a particular length. The instruction may 2304 may include any of the information in this specification about how to cut and use the plant manipulators. The instruction manual 2304 may be optional. The plant manipulator adjuster 2306 is a device capable of adjusting the configuration of the plant manipulator 2302. The plant manipulator adjuster 2306 may be any device, which can alter the plant manipulator 2302. In one embodiment, the plant manipulator adjuster 2306 may be a cutting device, such as a pair of scissors. The plant manipulator adjuster 2306 may be used to cut the plant manipulator 2302 to a particular length or to cut the flexible cylindrical member 202 at angles to allow the plant manipulator 2302 to bend. The plant manipulator adjuster 2306 may be optional, the kit not necessarily including the plant manipulator adjuster 2306.

What is claimed is:

1. A method for making a plant manipulator, comprising:
coupling a wire to a flexible cylindrical member, in a direction such that a length of the flexible cylindrical member is parallel to a length of the wire when coupled, the wire being made of a material that maintains a shape after being bent in the shape; wherein the flexible cylindrical member includes a slit running along the length of the flexible cylindrical member; the coupling further comprising:
placing the flexible cylindrical member in a bottom jig;
placing the wire in a top jig;
placing an adhesive on an exposed surface of the wire within the top jig;
assembling the top jig with the bottom jig, such that the adhesive on the wire contacts an exposed surface of the flexible cylindrical member.

2. The method of claim 1, further comprising
after the adhesive on the wire and the flexible cylindrical member adhere to one another, removing the top jig and the bottom jig from the wire and the flexible cylindrical member.

3. The method of claim 1, wherein only one flexible cylindrical member is placed in the bottom jig.

4. The method of claim 1, wherein the bottom jig includes a V shaped groove.

5. A method for making a plant manipulator, comprising:
coupling a long edge of a flexible cylindrical member to a long edge of a malleable rigid member, the long edge of the flexible cylindrical member being parallel to the long edge of the malleable rigid member when coupled, the malleable rigid member being made of a material that maintains a shape after being bent in the shape;
wherein the coupling further comprises:
placing the flexible cylindrical member in a bottom jig;
placing the malleable rigid member in a top jig;
placing an adhesive on an exposed surface of the malleable rigid member within the top jig;
assembling the top jig with the bottom jig, such that the adhesive on the malleable rigid member contacts an exposed surface of the flexible cylindrical member; and
wherein the placing of the malleable rigid member in a top jig further comprising anchoring the malleable rigid member by coupling a first end of the malleable rigid member to a first anchor and coupling a second end of the rigid member to a second anchor.

6. A method for using a plant manipulator, comprising:
placing a first end of a plant element in a slit of a flexible cylindrical member portion of a first end of the plant manipulator;
placing a second end of the plant element in a slit of a flexible cylindrical member portion of a second end of the plant manipulator; and
bending the plant manipulator so that the first end of the plant manipulator is situated at an angle from the second end of the plant manipulator, the plant manipulator maintaining a shape arrived at as a result of the bending.

7. The method of claim 6, the angle being between 5 degrees and 175 degrees.

8. The method of claim 6, wherein the first end of the plant element has been severed from the second end of the plant element.

9. A method for using a plant manipulator, comprising:
removing portions of a flexible cylindrical member by cutting the cylindrical member at angles with respect to a line perpendicular to an outer surface of the flexible cylindrical member;
placing a first end of a plant element in a slit of a flexible cylindrical member portion of a first end of the plant manipulator;
placing a second end of the plant element in a slit of a flexible cylindrical member portion of a second end of the plant manipulator; and
bending the plant manipulator so that the first end of the plant manipulator is situated at an angle from the second end of the plant manipulator, the plant manipulator maintaining a shape arrived at as a result of the bending.

10. A method for using a plant manipulator, comprising:
cracking a plant element;
placing a first end of the plant element in a slit of a flexible cylindrical member portion of a first end of the plant manipulator;
placing a second end of the plant element in a slit of a flexible cylindrical member portion of a second end of the plant manipulator; and
bending the plant manipulator so that the first end of the plant manipulator is situated at an angle from the second end of the plant manipulator, the plant manipulator maintaining a shape arrived at as a result of the bending.

11. A plant manipulator, comprising:
a flexible cylindrical member having at least a wall having a thickness, the wall having an exterior side and an interior side, a first end, a second end, a diameter, a length spanning from the first end to the second end, the length being perpendicular to the diameter, running along the length of the flexible cylindrical member, a slit completely penetrating the thickness of the wall of the flexible cylindrical member; and
a wire with a first and second end, a length of the wire, the wire being made of a material that maintains a shape after being bent in the shape;
wherein the wire is coupled to the flexible cylindrical member along the length of the flexible cylindrical member, wherein the wire can be bent by hand;
wherein the flexible cylindrical member has illustrations on the flexible cylindrical member's exterior side with lines marking locations where an end user may cut the flexible cylindrical member to allow the plant manipulator to bend at particular angles, each set of lines representing a different angle to which the plant manipulator may conform, wherein the lines are drawn in a manner indicating the wire is not cut when the end user cuts the flexible cylindrical member; wherein the lines outlines the cuts to make to form a v shaped notch.

12. A kit comprising:
a cutting utensil; and
plant manipulator, the plant manipulator including at least
a flexible cylindrical member having at least
a wall having a thickness and an exterior surface,
a first end,
a second end,
a diameter,
a length spanning from the first end to the second end, the length being perpendicular to the diameter,
a slit running along the length of the flexible cylindrical member, the slit completely penetrating the thickness of the wall of the flexible cylindrical member; and a malleable shape-maintaining flexible piece of material having at least
a first and second end,
a length extending from the first end to the second end,
the malleable shape-maintaining flexible piece of material being made of a material that maintains a shape after being bent in the shape;
wherein the malleable shape-maintaining flexible piece of material is coupled to the flexible cylindrical member along the length of the flexible cylindrical member.

13. The kit of claim 12, the plant manipulator being marked with lines indicating where to cut the flexible cylindrical member, and indicating not to cut the malleable shape-maintaining piece of material.

* * * * *